(12) United States Patent
Iwasaki

(10) Patent No.: US 7,999,874 B2
(45) Date of Patent: Aug. 16, 2011

(54) IMAGE-PICKUP APPARATUS AND FOCUS CONTROLLING METHOD

(75) Inventor: Naoki Iwasaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 432 days.

(21) Appl. No.: 12/356,883

(22) Filed: Jan. 21, 2009

(65) Prior Publication Data

US 2009/0185068 A1 Jul. 23, 2009

(30) Foreign Application Priority Data

Jan. 22, 2008 (JP) .................................. 2008-011348

(51) Int. Cl.
*G03B 13/00* (2006.01)

(52) U.S. Cl. ....................................................... 348/345

(58) Field of Classification Search .................... 348/345
See application file for complete search history.

(56) References Cited

U.S. PATENT DOCUMENTS

| | | | | |
|---|---|---|---|---|
| 5,570,236 A * | 10/1996 | Hirasawa | ........................ | 359/697 |
| 5,745,175 A * | 4/1998 | Anderson | ........................ | 348/345 |
| 6,928,241 B2 * | 8/2005 | Hirai | ............................ | 396/125 |
| 6,970,646 B2 | 11/2005 | Hirai | | |
| 7,106,376 B1 * | 9/2006 | Anderson | .................... | 348/345 |
| RE41,222 E * | 4/2010 | Hirai | ............................ | 396/91 |
| 7,742,096 B2 * | 6/2010 | Murakami | .................... | 348/335 |
| 2006/0238640 A1 * | 10/2006 | Hofer | ............................ | 348/345 |

FOREIGN PATENT DOCUMENTS

| JP | 03-068280 | 3/1991 |
|---|---|---|
| JP | 2004-109150 | 4/2004 |

* cited by examiner

*Primary Examiner* — Rodney Fuller
(74) *Attorney, Agent, or Firm* — Cowan, Liebowitz & Latman, P.C.

(57) ABSTRACT

The image-pickup apparatus performs a scan operation for sequentially obtaining focus evaluation values with movement of a focus lens and calculates an in-focus position on the focus evaluation values. The apparatus includes a controller configured to divide a movable range of the focus lens for the scan operation into plural zones, and to change a scan operation zone where the scan operation is performed from a current zone to a next zone among the plural zones when the focus evaluation value satisfies a predetermined condition. The controller sets, as the predetermined condition, a first condition for changing the scan operation zone from a specific zone to the next zone, and a second condition for changing the scan operation zone from a zone other than the specific zone to the next zone. The first condition is harder to be satisfied than the second condition.

5 Claims, 5 Drawing Sheets

IMAGE-PICKUP APPARATUS AND FOCUS CONTROLLING METHOD

BACKGROUND OF THE INVENTION

The present invention relates to an image-pickup apparatus that performs a scan operation for sequentially obtaining focus evaluation values from video signals with movement of a focus lens and calculates an in-focus position of the focus lens based on the focus evaluation values.

Many image-pickup apparatuses such as digital cameras employ an auto focus (AF) method referred to as a TV-AF method. As shown in FIG. 6, the TV-AF method causes a focus lens to move in a predetermined movable range (for example, a range from an infinite end to a close end) to obtain AF evaluation values from the video signals at respective focus lens positions. The method subsequently determines, as an in-focus position, a focus lens position at which a maximum AF evaluation value is obtained (see Japanese Patent Laid-Open No. 3-68280).

Further, in the TV-AF method, when a focal length of an image-pickup optical system is long and the movable range of the focus lens is wide, or when a depth of field of the image-pickup optical system is small so that the focus lens needs to be finely moved, a great number of samples of the AF evaluation values need to be obtained. In this case, it takes long time to collect the AF evaluation values, resulting in disabling a high-speed AF operation.

Japanese Patent Laid-Open No. 2004-109150 discloses an image-pickup apparatus that divides an entire object distance range (that is, an entire movable range of the focus lens) into plural zones and that selects from the plural zones a zone for actually moving the focus lens to obtain the AF evaluation values. Further, the image-pickup apparatus appropriately changes the zone where the focus lens is moved based on a predetermined condition, thereby realizing a high-speed AF operation.

However, even in the case where the zone for obtaining the AF evaluation values is selected as disclosed in Japanese Patent Laid-Open No. 2004-109150, if the movable range of the focus lens is wide enough to include a macro range and a non-macro range, a large number of zones can be selected. As a result, the number of samples of the AF evaluation values may be extremely large.

BRIEF SUMMARY OF THE INVENTION

The present invention provides an image-pickup apparatus that performs a high-speed AF operation even if a movable range of a focus lens is wide or the focus lens needs to be finely moved.

The present invention provides as an aspect thereof an image-pickup apparatus which performs a scan operation for sequentially obtaining focus evaluation values from video signals with movement of a focus lens and calculates an in-focus position of the focus lens based on the focus evaluation values. The apparatus includes a controller configured to divide a movable range of the focus lens for the scan operation into plural zones, and to change a scan operation zone where the scan operation is performed from a current zone where the focus lens is currently located to a next zone among the plural zones when the focus evaluation value satisfies a predetermined condition. The controller sets, as the predetermined condition, a first condition for changing the scan operation zone from a specific zone to the next zone, and a second condition for changing the scan operation zone from a zone other than the specific zone to the next zone. The first condition is harder to be satisfied than the second condition.

The present invention provides as another aspect thereof a method for controlling focus of an image-pickup apparatus which performs a scan operation for sequentially obtaining focus evaluation values from video signals with movement of a focus lens and calculates an in-focus position of the focus lens based on the focus evaluation values. The method includes a controlling step of dividing a movable range of the focus lens for the scan operation into plural zones, and changing a scan operation zone where the scan operation is performed from a current zone where the focus lens is currently located to a next zone among the plural zones when the focus evaluation value satisfies a predetermined condition. The controlling step sets, as the predetermined condition, a first condition for changing the scan operation zone from a specific zone to the next zone, and a second condition for changing the scan operation zone from a zone other than the specific zone to the next zone. The first condition is harder to be satisfied than the second condition.

Other aspects of the present invention will be apparent from the embodiments described below with reference to the drawings.

DETAILED DESCRIPTION OF THE EMBODIMENTS

Exemplary embodiments of the present invention will be described below with reference to the accompanied drawings.

Figure 1:
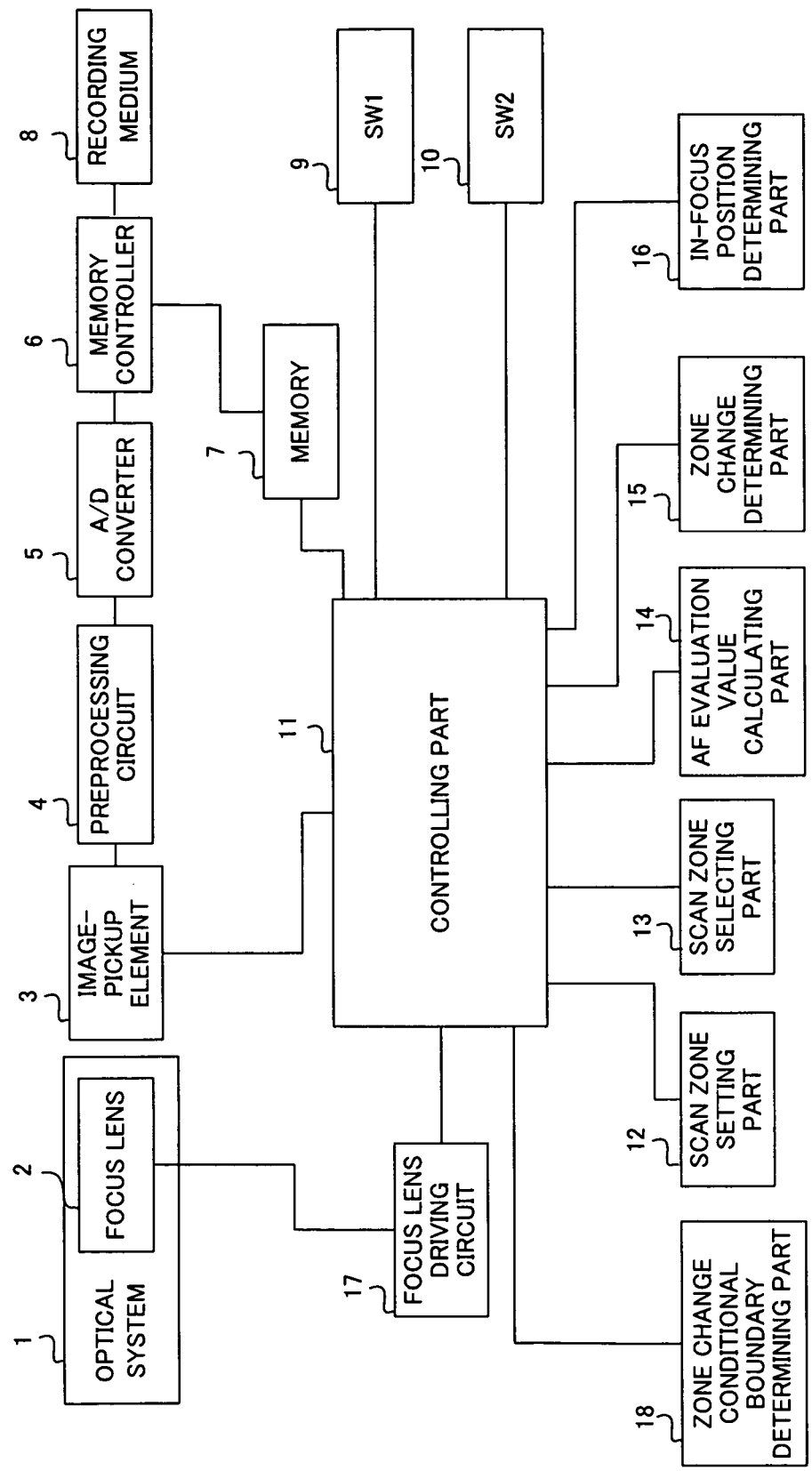
FIG. 1 is a block diagram showing the configuration of a digital camera that is an embodiment of the present invention.

FIG. 1 shows the configuration of a digital camera (image-pickup apparatus) that is an embodiment of the present invention. The digital camera includes an image-pickup optical system 1 including a focus lens 2, an image-pickup element 3, a preprocessing circuit 4, an A/D converter 5, a memory controller 6, a memory 7, a switch (SW1) 9, a switch (SW2) 10, and a controlling part 11.

The digital camera further includes a scan zone setting part 12, a scan zoon selecting part 13, an AF evaluation value calculating part 14, a zone change determining part 15, an in-focus position determining part 16, a focus lens driving circuit 17, and a zone change conditional boundary determining part 18.

The image-pickup optical system 1 forms an object image on the image-pickup element 3. The image-pickup element 3, which is a photoelectric conversion element formed of a CCD sensor or a CMOS sensor, converts the object image into electric signals (analog signals). The focus lens 2 is moved in a direction of an optical axis of the image-pickup optical system 1 for focusing.

The preprocessing circuit 4 includes a CDS (Correlated Double Sampling) circuit that removes output noise, and a nonlinear amplification circuit that performs a nonlinear amplification prior to the A/D conversion.

The A/D converter 5 converts an analog signal output from the preprocessing circuit 4 into a digital signal.

The memory controller 6 stores the digital signal output from the A/D converter 5 in the memory 7. The memory 7 records the digital signal. A signal processing circuit (not shown) converts the digital signal stored in the memory 7 into a video signal and records the video signal in a recording medium 8 such as a semiconductor memory or an optical disk.

The switch (SW1) 9 is operated by a user for instructing an image-pickup preparation operation including an AF (auto focus) operation and a photometry operation. The switch (SW2) 10 is operated by the user for instructing generation of a recording image and record thereof to the recording medium 8 (hereinafter, these operations are collectively referred to as an image-pickup recording operation).

The controlling part 11 controls the overall operations of the digital camera including the AF operation according to a computer program stored in an internal memory (not shown) or supplied from the outside of the camera.

The scan zone setting part 12 divides a movable range of the focus lens 2 for a scan operation into plural scan zones. The scan operation is performed to sequentially obtain AF evaluation values (focus evaluation values) at respective focus lens positions with movement of the focus lens 2 in each scan zone.

The zone change conditional boundary determining part 18 sets a boundary at which a condition (predetermined condition) for changing the scan zone where the scan operation is performed is changed. In the following description, the scan zone where the scan operation is performed is referred to as "scan operation zone", and changing the scan operation zone is referred to as "zone change".

The scan zoon selecting part 13 determines an order of the scan zones selected as the active scan zone.

The AF evaluation value calculating part 14 performs filtering processing using a band pass filter (BPF) on the video signal generated by the signal processing circuit to extract a middle and high frequency component of the video signal, and then extracts a maximum value from the extracted middle and high frequency component as an AF evaluation value signal. A value of the AF evaluation value signal thus generated is the AF evaluation value.

A method may be employed which extracts maximum values of the middle and high frequency component along an X-axis direction in filtering by the BPF within a predetermined AF frame and then integrates the maximum values in a Y-axis direction orthogonal to the X-axis direction to obtain the AF evaluation value.

The zone change determining part 15 determines whether or not to change the scan operation scan zone based on the AF evaluation values. That is, the zone change determining part 15 determines whether or not to move the focus lens 2 from a scan zone (current scan zone) where the focus lens 2 is currently located to a next scan zone.

The in-focus position determining part 16 determines an in-focus position based on the AF evaluation values obtained in each scan zone.

The focus lens driving circuit 17 moves the focus lens 2 to the determined in-focus position to obtain an in-focus state of the image-pickup optical system 1.

Next, a brief description will be made of the AF operation performed mainly by the controlling part 11 in the digital camera of the present embodiment. The controlling part 11, the scan zone setting part 12, the scan zoon selecting part 13, the zone change conditional boundary determining part 18, the AF evaluation value calculating part 14, the zone change determining part 15, the in-focus position determining part 16, and the focus lens driving circuit 17 constitute a controller.

When the switch (SW1) 9 is operated by the user, the controlling part 11 causes the scan zone setting part 12 to divide the movable range of the focus lens 2 (i.e., the object distance from an infinite end to a close end) into plural scan zones. The controlling part 11 also causes the zone change conditional boundary determining part 18 to determine a boundary between the scan zones at which a zone change condition (first and second change conditions), which will be described below, is changed.

The controlling part 11 then performs the scan operation in the scan operation zone selected by the scan zoon selecting part 13. Specifically, the controlling part 11 causes the focus lens driving circuit 17 to move the focus lens 2 in the selected scan operation zone, and sequentially obtains the AF evaluation values at plural predetermined focus lens positions (hereinafter referred to as scan points) through the AF evaluation value calculating part 14.

The controlling part 11 then causes the zone change determining part 15 to determine (decide) whether or not to change the scan operation zone based on the AF evaluation value obtained at each scan point. That is, the controlling part 11 causes the zone change determining part 15 to determine whether or not to change the scan zone where the scan operation is performed from the current scan zone to another scan zone.

After repeating the change of the scan operation zone and the scan operation as described above, the controlling part 11 causes the in-focus position determining part 16 to determine the in-focus position of the focus lens 2 based on the AF evaluation values sequentially obtained by the scan operation. Then, the controlling part 11 causes the focus-lens driving circuit 17 to move the focus lens 2 to the determined in-focus position.

After the in-focus state is thus acquired, the controlling part 11 performs the image-pickup recording operation in response to the user's operation of the switch (SW2) 10.

Figure 2:
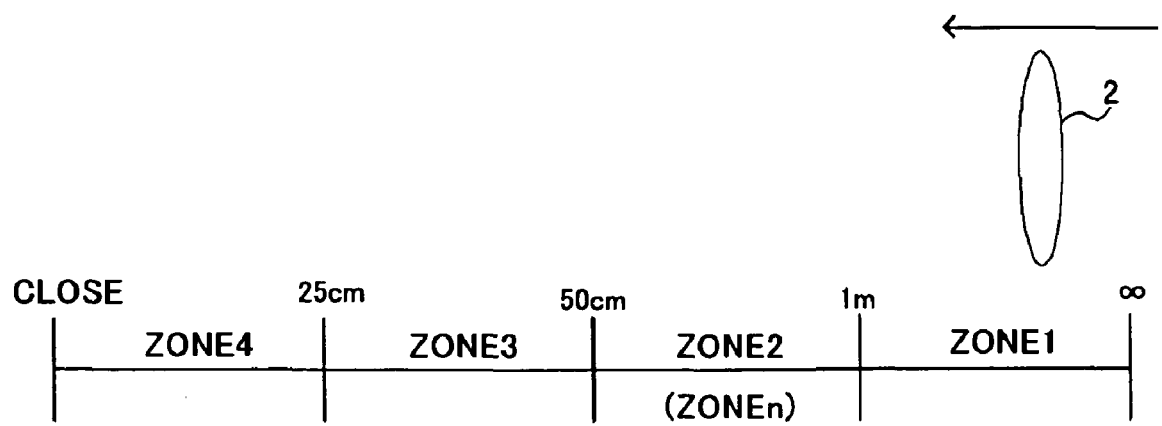
FIG. 2 shows an example in which a movable range of a focus lens is divided into plural scan zones in the embodiment.

FIG. 2 shows an example of the divided scan zones set by the scan zone setting part 12. The example shows a case where the movable range of the focus lens 2 from an infinite end to a close end is divided into four scan zones (zones 1 to 4). The zone 1 is set as a zone from the infinite end to 1 m, the zone 2 from 1 m to 50 cm, the zone 3 from 50 cm to 25 cm, and the zone 4 from 25 cm to the close end.

The dividing method for the scan zones is not limited to the above. Another dividing method may be decided by putting a priority on a scan speed or on the object distance, or may be arbitrarily decided depending on image-pickup conditions.

Further, the dividing number of the scan zones can be changed depending on a focal length or an aperture value of the image-pickup optical system 1 for image pickup. In this case, the dividing number can increase as the focal length increases, and can decrease as the aperture value increase.

The scan zoon selecting part 13 determines the changing order of the scan operation zone in the plural scan zones. In the present embodiment, the changing order is:

the zone 1→the zone 2→the zone 3→the zone 4.

That is, the scan operation is performed from the infinite side scan zone.

The reason for setting the divided scan zones is to detect an object that is an in-focus target as quickly as possible and to end the scan operation in the scan zone where the object exists so that time required for the AF operation is reduced. Thus, it is preferable that the scan operation is started from a scan zone where the in-focus target object is most likely to exist.

Accordingly, it is also possible to set the changing order of the scan operation zone depending on image-pickup modes as follows. For example, in a scenery image-pickup mode, the scan operation may be performed from the infinite side scan zone to the close side scan zone. In a person image-pickup mode, the scan operation is performed from the close side scan zone to the infinite side scan zone. Such changing orders make it possible to acquire the in-focus state for a user-intended object as quickly as possible.

The zone change conditional boundary determining part 18 determines the boundary at which the zone change condition that is a condition for changing the scan operation zone is changed. In the present embodiment, the boundary is determined between the zones 2 and 3, that is, between a non-macro range including the zones 1 and 2 and a macro range including the zones 3 and 4. At the boundary, the zone change condition (first condition) for changing the scan operation zone from the zone 2 to the zone 3 is set as a condition harder to be satisfied, in other words more difficult for changing the scan operation zone, than the zone change condition (second condition) for changing the scan operation zone from a zone other than the zone 2 to another zone (next zone). The zone 2 corresponds to a "specific zone", and the zone 3 corresponds to a "next zone" for the specific zone.

Next, the controlling part 11 causes the focus lens 2 to move in the respective divided scan zones for sequentially performing the scan operation to obtain the AF evaluation values in each scan zone. Then, the controlling part 11 finally determines the in-focus position using the obtained AF evaluation values.

Figure 3:
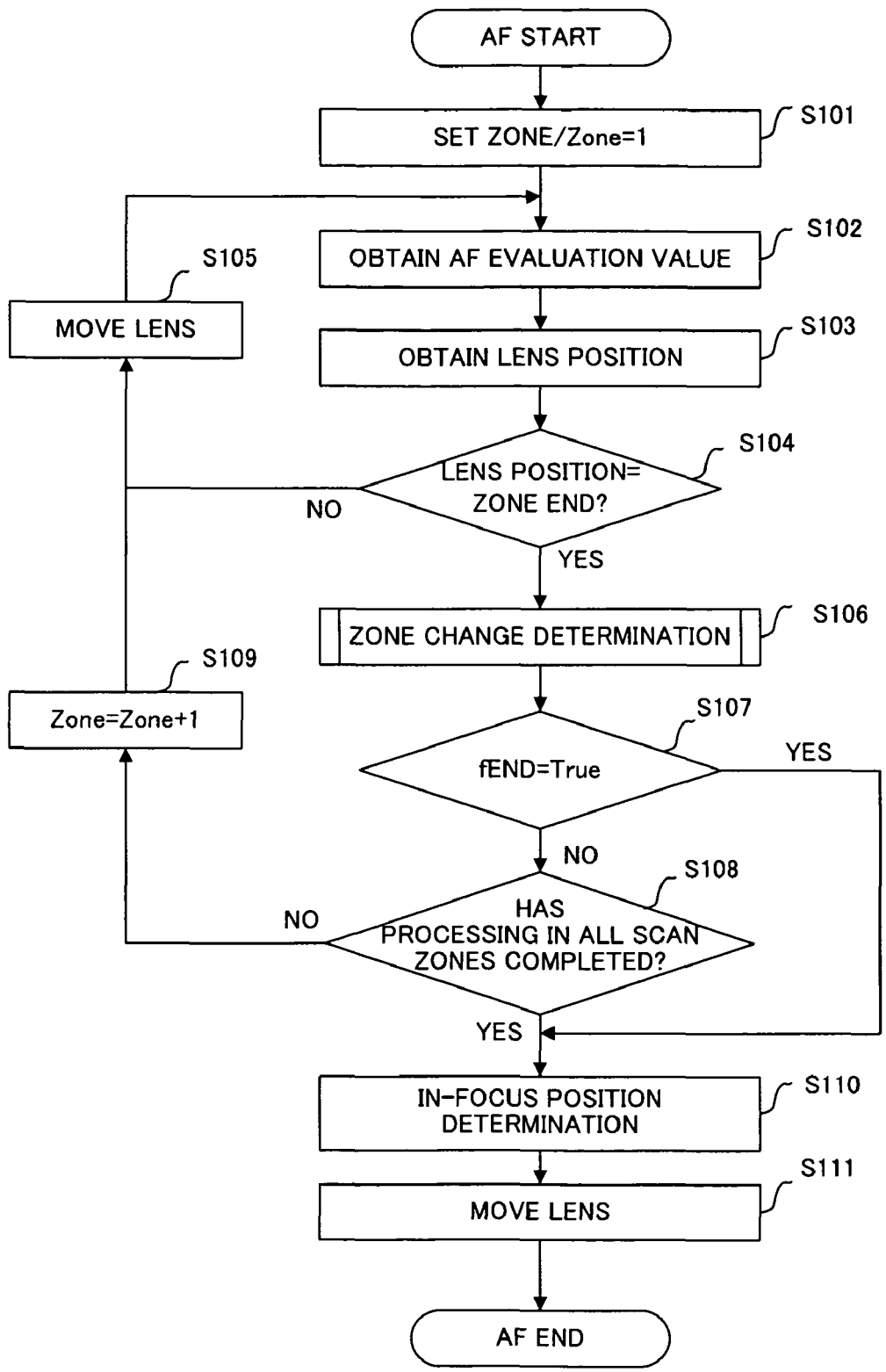
FIG. 3 is a flowchart showing an AF operation in the camera of the embodiment.

The processes in the AF operation (focus control method) which were briefly described above will hereinafter be described more specifically using a flowchart of FIG. 3. The processes shown in the flow chart are performed according to a computer program stored in the controlling part 11.

In step S101, the controlling part 11 causes the scan zone setting part 12 to set the scan operation zone for performing the scan operation. In a case where the changing order of the scan operation zone is, as described above:

the zone 1→the zone 2→the zone 3→the zone 4, the controlling part 11 initializes a zone counter variable (Zone) to "1" so as to set the zone 1 as the scan operation zone.

In step S102, the controlling part 11 starts the scan operation in the scan operation zone set by the scan zone setting part 12 to obtain the AF evaluation values therein through the AF evaluation value calculating part 14.

In step S103, the controlling part 11 obtains a current position of the focus lens 2. In step S104, the controlling part 11 determines whether or not the obtained position of the focus lens 2 corresponds to an end (hereinafter referred to as a zone end) of the scan operation zone. If it does not correspond to the zone end, the controlling part 11 in steps S105 and S102 obtains the AF evaluation values with movement of the focus lens 2 until the focus lens 2 reaches the zone end. If it corresponds to the zone end, the process proceeds to step S106.

In step S106, the controlling part 11 causes the zone change determining part 15 to perform zone change determination processing using the AF evaluation values obtained through the AF evaluation value calculating part 14.

The zone change determination processing is performed using the zone change condition relating to the AF evaluation value. For example, the zone change condition relates to a difference of heights of the AF evaluation values and an increasing/decreasing state of the AF evaluation value.

Figure 4:
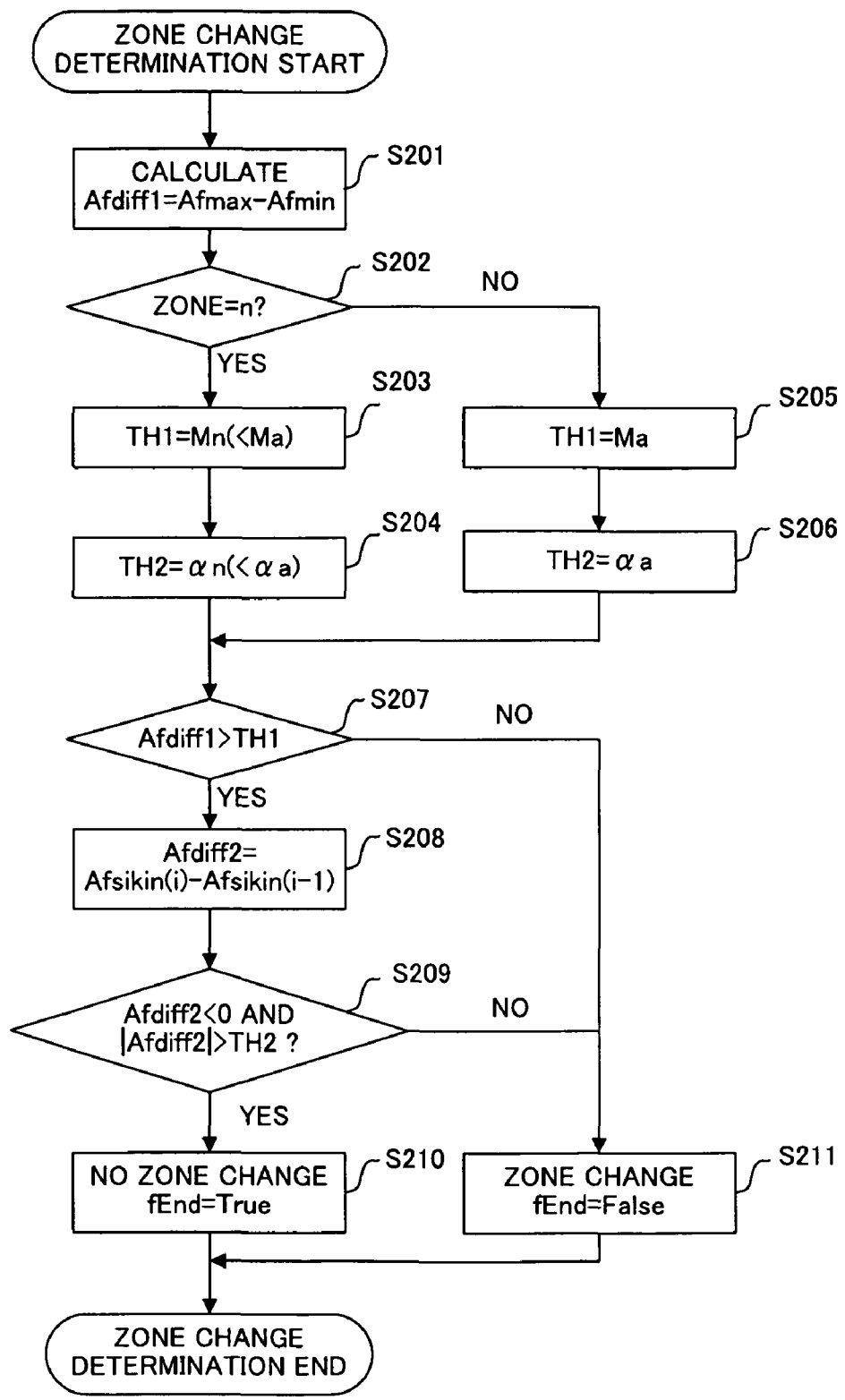
FIG. 4 is a flowchart showing zone change determination processing in the camera of the embodiment.
Figure 5:
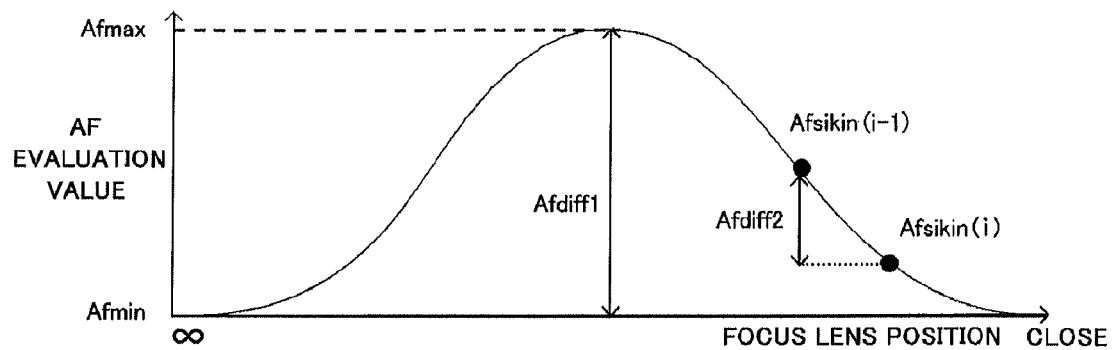
FIG. 5 is a diagram showing a relationship between the scan zone and the AF evaluation value in the embodiment.
Figure 6:
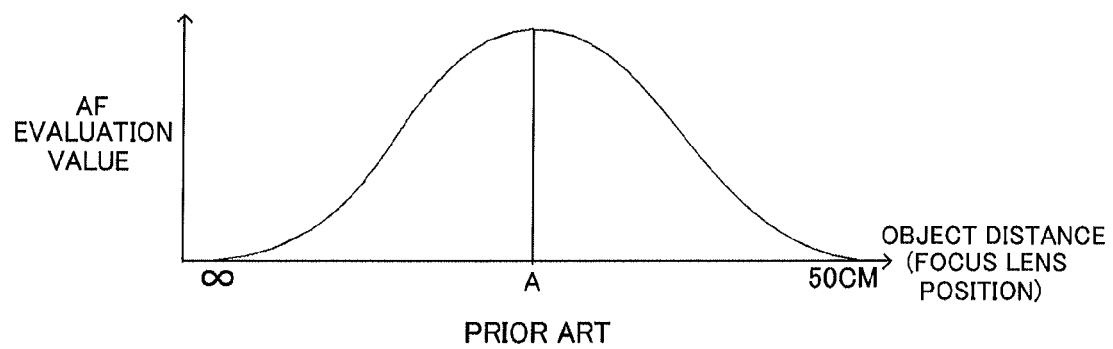
FIG. 6 is a diagram showing a relationship between object distances (focus lens positions) and the AF evaluation values.

Description will be made of an example of the zone change determination processing with reference to a flowchart of FIG. 4. In step S201, the zone change determining part 15 calculates:

$$Af\text{diff1} = Af\text{max} - Af\text{min}$$

which is a difference between a maximum value "Afmax" and a minimum value "Afmin" of the AF evaluation values (that is, the difference between the heights of the AF evaluation values) obtained in all scan zones where the scan operation has been performed so far (refer to FIG. 5).

Description will be continued supposing that, in a normal image-pickup mode, the boundary between the macro range and the non-macro range is set at a close side zone end of a zone n (zone 2 in FIG. 2) included in the non-macro range. In this case, the zone change conditional boundary determining part 18 sets the zone n as the scan zone whose zone change condition is to be changed with respect to those of the other scan zones.

In step S202, the zone change determining part 15 determines whether or not the scan operation zone (current zone) where the scan operation is currently being performed is the zone n. If the current scan operation zone is the zone n, the process proceeds to steps S203 and S204, and if not, to steps S205 and S206.

In steps S203 and S205, the zone change determining part 15 determines the first zone change condition. Specifically, the zone change determining part 15 determines a threshold value TH1 in the following expression that is the first zone change condition:

$$Af\text{diff1} > TH1 \qquad (1).$$

Further, in steps S204 and S206, the zone change determining part 15 determines the second zone change condition. Specifically, the zone change determining part 15 determines a threshold value TH2 in the following expression that is part of the second zone change condition:

$$|Af\text{diff2}| > TH2 \qquad (2).$$

As shown in FIG. 5, "Afdiff2" represents a difference between an AF evaluation value "Afsikin (i)" at a close side zone end of the current scan operation zone and an AF evaluation value "Afsikin (i-1)" at a close side end of a scan zone (i-1) which is one previous to the current scan operation zone. In other words, "Afdiff2" represents the increasing/decreasing state of the AF evaluation value between those two zone ends.

For the sake of convenience, each of the expressions (1) and (2) is referred to as the "zone change condition". However, as understood from steps S207 and S209 which will be described below, when the expression (1) or (2) is satisfied, the zone change is not performed. Therefore, the expressions (1) and (2) are essentially conditions for not performing the zone change. Accordingly, not satisfying at least one of the expressions (1) and (2) satisfies the condition (predetermined condition) for performing the zone change.

In step S203, the zone change determining part 15 sets as the threshold value TH1 a value Mn smaller than a value Ma which is set as the threshold value TH1 in step S205. Further, in step S204, the zone change determining part 15 sets as the threshold value TH2 a value αn smaller than a value αa which is set as the threshold value TH2 in step S206.

Smaller threshold values TH1 and TH2 make the zone change harder to be performed. Therefore, in steps S203 and S204, the zone change determining part 15 sets as TH1 and TH2 threshold values making the zone change harder to be performed than the threshold values set as TH1 and TH2 in steps S205 and S206. This means that the zone change condition for changing the scan operation zone from the zone n to its next zone included in the macro range is set harder to be satisfied than the zone change condition for changing the scan operation zone from a scan zone other than the zone n to its next zone.

This is because, in normal image pickup which is non-macro image pickup, an object in the non-macro range is picked up, so that it is not necessary to perform the scan operation in the macro range. Setting the threshold values TH1 and TH2 that make the zone change determination hard to be made in the zone n prevents an unnecessary scan operation in the macro range, which makes it possible that the scan operation in the normal image-pickup mode is appropriately performed in the non-macro range.

However, in a case where a user who is not familiar to a camera having a function of switching between the macro image-pickup mode and the normal image-pickup mode, the user often uses the camera for macro image pickup in the normal image-pickup mode. On the other hand, the user may use the camera for normal image pickup in the macro image-pickup mode. Therefore, a mode which makes the zone change from the non-macro range to the macro range hard to be performed may be provided to the camera having the function of switching between the macro image-pickup mode and the normal image-pickup mode, without completely prohibiting that zone change. Using such a mode enables, even when the macro image pickup is performed in the normal image-pickup mode or the normal image-pickup is performed in the macro image-pickup mode, acquisition of the in-focus state respectively in the macro range and the non-macro range.

Next, in step S207, the zone change determining part 15 determines whether or not the first zone change condition (Afdiff1>TH1) is satisfied. When the first zone change condition is satisfied, the process proceeds to step S208. On the other hand, when the first zone change condition is not satisfied (that is, the condition for changing the scan operation zone is satisfied), the zone change determining part 15 regards a maximum value of the AF evaluation value as unobtainable by the scan operations up to the current scan operation zone, and thus the process proceeds to step S211. In step S211, the zone change determining part 15 sets "False" for an end flag "fEnd" to change the scan operation zone.

In step S208, the zone change determining part 15 calculates the value of "Afdiff2". A negative value of "Afdiff2" indicates that the AF evaluation value is decreasing in a close side area in the current scan operation zone. When the value of "Afdiff2" is a negative value larger than the threshold value TH2, it can be estimated that the maximum value of the AF evaluation value can be obtained by the scan operation up to the current scan operation zone. A positive value of "Afdiff2" indicates that the AF evaluation value is increasing in the close side area in the current scan operation zone.

Therefore, in step S209, the zone change determining part 15 determines whether or not the second zone change condition (Afdiff2<0 and |Afdiff2|>TH2) is satisfied. When the second zone change condition is not satisfied, the maximum value of the AF evaluation value is likely to be obtained in a scan zone different from the current scan operation zone. Therefore, when the second zone change condition is not satisfied (that is, the condition for changing the scan operation zone is satisfied), the process proceeds to step S211. In step S211, the zone change determining part 15 sets "False" for the end flag "fEnd" to change the scan operation zone.

On the other hand, when the second zone change condition is not satisfied, the process proceeds to step S210. In step S210, the zone change determining part 15 sets "True" for the end flag "fEnd" to not perform the zone change.

The values Mn, Ma, αn, and αa set as the threshold values TH1 and TH2 in steps S203 to S206 are not necessary to be fixed values, and may be changed depending on the image-pickup conditions or setting statuses of the camera relating to image pickup (including the image-pickup mode or the number of the scan zones). Changing the values Mn, Ma, αn, and αa enables change of a level of the condition for changing the scan operation zone.

Further, the position of the zone n may be changed depending on the setting statuses of the camera relating to image pickup such as the image-pickup mode.

Returning to FIG. 3, in step S107, the controlling part 11 determines whether or not the end flag "fEnd" sent from the zone change determining part 15 is "True". When the end flag "fEnd" is "False", the process proceeds to step S108 where the controlling part 11 determines whether or not the processes described above for all scan zones have been completed. When they have not been completed, the process proceeds to step S109. In step S109, the controlling part 11 increments the zone counter variable (Zone) by one. The controlling part 11 then moves the focus lens 2 in step S105 to the next scan zone to perform the scan operation (step S102) therein.

Further, if the processes for all scan zones have been completed in step S108, the process proceeds to step S110 where the controlling part 11 performs in-focus position determination processing.

On the other hand, when the end flag "fEnd" is "True" in step S107, the process directly proceeds to step S110 where the controlling part 11 performs the in-focus position determination processing.

In the in-focus position determination processing, the controlling part 11 causes the in-focus position determining part 16 to determine as the in-focus position a position of the focus lens 2 where the maximum value of the AF evaluation value has been obtained by the scan operation. Subsequently, the process proceeds to step S111 where the controlling part 11 causes the focus-lens driving circuit 17 to move the focus lens 2 to the determined in-focus position. Then, the AF processing is completed.

According to the above-described embodiment, the entire movable range of the focus lens including the non-macro and macro ranges is divided into plural scan zones, and the scan operation is performed in the selected scan zone (scan operation zone). Further, depending on whether or not the AF evaluation value obtained by the scan operation has a value or a change which satisfies the predetermined condition, a determination is made of whether or not the scan operation zone for performing the scan operation is to be changed. The predetermined condition required to change the scan operation zone from a scan zone in the non-macro range to a scan zone in the macro range is set harder to be satisfied than the conditions required to change the scan operation zone between other scan zones.

In the camera of the present embodiment, when an object that is an in-focus target is quickly detected by the scan operation up to a certain scan zone, a more scan operation is not necessary in other scan zones, resulting in reducing time to perform the AF operation. Further, since the zone change from the non-macro range to the macro range is hard to be performed, cases where the scan operation is performed in the macro range in the normal image-pickup mode are reduced, resulting in reducing time to perform the AF operation.

Further, since the zone change from the non-macro range to the macro range is not prohibited, even when a user who intends to perform the normal image pickup mistakenly performs the macro image pickup, the in-focus position can be acquired in the macro range.

In other words, according to the above-described embodiment, the condition required to change the scan operation zone where the scan operation is performed from the specific zone to the next zone is set harder to be satisfied (or set higher or more strictly) than the condition required to change the scan operation zone from a zone other than the specific zone to the next zone. Therefore, since cases where the scan operation zone changes from the specific zone to the next zone is limited to some extent, the in-focus position can be acquired in a short time as compared to the scan operation is performed in the subsequent zones of the specific zone. This enables a high-speed AF operation.

Additionally, since the change of the scan operation zoon from the specific zone to the next zone is not prohibited, if the condition required for that change is satisfied, the in-focus position can be acquired by the scan operation in a wider range. Therefore, an AF function of the camera can be improved.

While the present invention has been described with reference to an exemplary embodiment, it is to be understood that the invention is not limited to the disclosed exemplary embodiment. The scope of the following claims is to be accorded the broadest interpretation so as to encompass all modifications, equivalent structures and functions.

For example, the changing order of the scan operation zone described in the embodiment is merely an example. The scan operation zone may be changed from the close side, that is, from the zone 4 the zone 3 the zone 2 the zone 1. In this case, the zone 3 corresponds to the specific zone, and the zone 2 corresponds to the next zone for the specific zone. Further, the scan operation may be performed from the zone 2 the zone 1 the zone 3 the zone 4. In this case, the zone 1 corresponds to the specific zone, and the zone 3 corresponds to the next zone for the specific zone.

Furthermore, in the above embodiment, the description was made of the case where the boundary at which the condition for the zone change is changed is set only at the boundary between the non-macro range and the macro range. However, plural boundaries may be set depending on the image-pickup conditions and the setting statuses of the camera. For example, it is preferable to set plural boundaries for a camera in which a close end can be set on a closer side or a camera in which a minimum movable range of a focus lens is set extremely small. These settings can further reduce the time to perform the AF operation.

This application claims the benefit of Japanese Patent Application No. 2008-011348, filed on Jan. 22, 2008, which is hereby incorporated by reference herein in its entirety.

What is claimed is:

1. An image-pickup apparatus which performs a scan operation for sequentially obtaining focus evaluation values from video signals with movement of a focus lens and calculates an in-focus position of the focus lens based on the focus evaluation values, the apparatus comprising:
   a controller configured to divide a movable range of the focus lens for the scan operation into plural zones, and to change a scan operation zone where the scan operation is performed from a current zone where the focus lens is currently located to a next zone among the plural zones when the focus evaluation value satisfies a predetermined condition,
   wherein the controller sets, as the predetermined condition, a first condition for changing the scan operation zone from a specific zone to the next zone, and a second condition for changing the scan operation zone from a zone other than the specific zone to the next zone, and
   wherein the first condition is harder to be satisfied than the second condition.

2. The image-pickup apparatus according to claim 1, wherein the next zone for the specific zone is closer to a close end than the specific zone.

3. The image-pickup apparatus according to claim 1, wherein the controller changes the predetermined condition for changing the scan operation zone from the specific zone to the next zone depending on a setting status of the image-pickup apparatus.

4. The image-pickup apparatus according to claim 1, wherein the controller changes the specific zone depending on a setting status of the image-pickup apparatus.

5. A method for controlling focus of an image-pickup apparatus which performs a scan operation for sequentially obtaining focus evaluation values from video signals with movement of a focus lens and calculates an in-focus position of the focus lens based on the focus evaluation values, the method comprising:
   a controlling step of dividing a movable range of the focus lens for the scan operation into plural zones, and changing a scan operation zone where the scan operation is performed from a current zone where the focus lens is currently located to a next zone among the plural zones when the focus evaluation value satisfies a predetermined condition,
   wherein the controlling step sets, as the predetermined condition, a first condition for changing the scan operation zone from a specific zone to the next zone, and a second condition for changing the scan operation zone from a zone other than the specific zone to the next zone, and
   wherein the first condition is harder to be satisfied than the second condition.

* * * * *